United States Patent
Hadley et al.

(10) Patent No.: US 10,433,474 B2
(45) Date of Patent: Oct. 8, 2019

(54) APPARATUS AND METHOD FOR SAFE UNFOLD/FOLD OF AGRICULTURAL IMPLEMENTS

(71) Applicant: CNH Industrial America LLC, New Holland, PA (US)

(72) Inventors: Parvathy K. Hadley, Greenwood, IN (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/365,991

(22) Filed: Mar. 27, 2019

(65) Prior Publication Data

US 2019/0216002 A1   Jul. 18, 2019

Related U.S. Application Data

(62) Division of application No. 15/399,413, filed on Jan. 5, 2017, now Pat. No. 10,278,323.

(51) Int. Cl.
| | |
|---|---|
| *A01B 73/04* | (2006.01) |
| *A01B 51/04* | (2006.01) |
| *A01B 76/00* | (2006.01) |

(52) U.S. Cl.
CPC ............ *A01B 73/046* (2013.01); *A01B 51/04* (2013.01); *A01B 76/00* (2013.01)

(58) Field of Classification Search
CPC ....... A01B 73/02; A01B 73/04; A01B 73/042; A01B 73/044; A01B 73/046; E02F 9/264; E02F 9/265
See application file for complete search history.

(56) References Cited

U.S. PATENT DOCUMENTS

| | | | |
|---|---|---|---|
| 4,151,886 A | 5/1979 | Boetto | |
| 5,687,798 A | 11/1997 | Henry | |
| 6,067,024 A * | 5/2000 | Eckstine | ................ B66C 13/46 |
| | | | 340/679 |
| 6,220,366 B1 * | 4/2001 | Noonan | ............... A01B 73/046 |
| | | | 172/311 |
| 2002/0017389 A1 | 2/2002 | Moser | |
| 2010/0200256 A1 | 8/2010 | Gadzella | |
| 2011/0315411 A1 | 12/2011 | Adams | |
| 2012/0095651 A1 | 4/2012 | Anderson | |
| 2012/0095652 A1 * | 4/2012 | Anderson | ................ G06K 9/00 |
| | | | 701/50 |
| 2014/0060868 A1 | 3/2014 | Blunier | |
| 2016/0212929 A1 | 7/2016 | Wileniec | |
| 2017/0079197 A1 | 3/2017 | Steinlage | |

* cited by examiner

*Primary Examiner* — Katy M Ebner
(74) *Attorney, Agent, or Firm* — Rebecca L. Henkel; Richard K. DeMille

(57) ABSTRACT

An agricultural implement having ground engaging components and inboard and outboard frame members are safely unfolded by using a radar or laser sensor to detect the presence of an obstacle in the unfolded position. A warning signal or disabling the unfolding process occurs when an obstacle is detected.

3 Claims, 3 Drawing Sheets

APPARATUS AND METHOD FOR SAFE UNFOLD/FOLD OF AGRICULTURAL IMPLEMENTS

CROSS REFERENCE TO RELATED APPLICATIONS

The present application is a divisional non-provisional utility patent application which is based on and takes priority from U.S. patent application Ser. No. 15/399,413, filed Jan. 5, 2017, entitled "APPARATUS AND METHOD FOR SAFE UNFOLD/FOLD OF AGRICULTURAL IMPLEMENTS," which is hereby incorporated by reference herein in its entirety.

BACKGROUND OF THE DISCLOSURE

1. Field of the Disclosure

The present disclosure relates to agricultural implements, and, more specifically, to implements that are unfolded from a transport position to an extended field position.

2. Description of the Related Art

In the continuous quest to provide more efficient farming operations, folding agricultural implements have been constructed to provide ever increasing lateral width. As a result, a given pass through a field processes a greater number of rows. While this approach is fine for in field operation, the access between fields frequently requires a transport dimension in terms of width and height that is greatly reduced. In certain jurisdictions, governmental regulations provide limits on the transport dimensions, both width wise and height wise.

It is current practice to use folding implements having a center frame member and at least inboard and outboard frame members articulated between a field position in which the frame members are fully extended and a transport position in which they are folded onto the center section for transport. With increasing lateral spans of the equipment in the field position, it becomes important to determine if it is safe to lower the outermost sections to the ground. The operator may not always be in a position to detect obstacles.

Accordingly, what is needed in the art is a configuration allowing for the safe unfolding of implements to a field position.

SUMMARY OF THE DISCLOSURE

The present disclosure achieves safe unfolding of implements to a field position.

In one form, the disclosure is a folding frame ground engaging implement including a center frame member and ground support wheels connected to the center frame member for guiding the center frame member in a travel direction. At least one frame member is articulated to the center frame member for extending laterally to an elongated field position and folded in a transport position. Ground support wheels are provided for the at least one frame member. A device is provided for folding and unfolding the at least one frame member and a sensor is mounted on the center frame and aimed in a lateral direction to determine the presence of an object in the path of the at least one frame member when it is unfolded to the laterally extending position.

In another form, the disclosure is a method of unfolding a folding ground engaging implement having a center frame member and at least one frame member articulated to the center frame member and ground engaging wheels supporting the center frame member, and a device for unfolding the at least one frame member. The method includes the steps of initiating unfolding the at least one frame member toward its unfolded position, determining the presence of an obstacle in the unfolded position of the at least one frame member and generating one of a warning signal and a disabling signal to the unfolding device in response to detection of an obstacle.

An advantage of the present disclosure is a safe unfolding of an agricultural implement to its field position.

Another advantage is that it achieves a safe unfolding process with a minimum of additional components.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

Corresponding reference characters indicate corresponding parts throughout the several views. The exemplifications set out herein illustrate embodiments of the disclosure and such exemplifications are not to be construed as limiting the scope of the disclosure in any manner.

DETAILED DESCRIPTION OF THE DISCLOSURE

Figure 1:
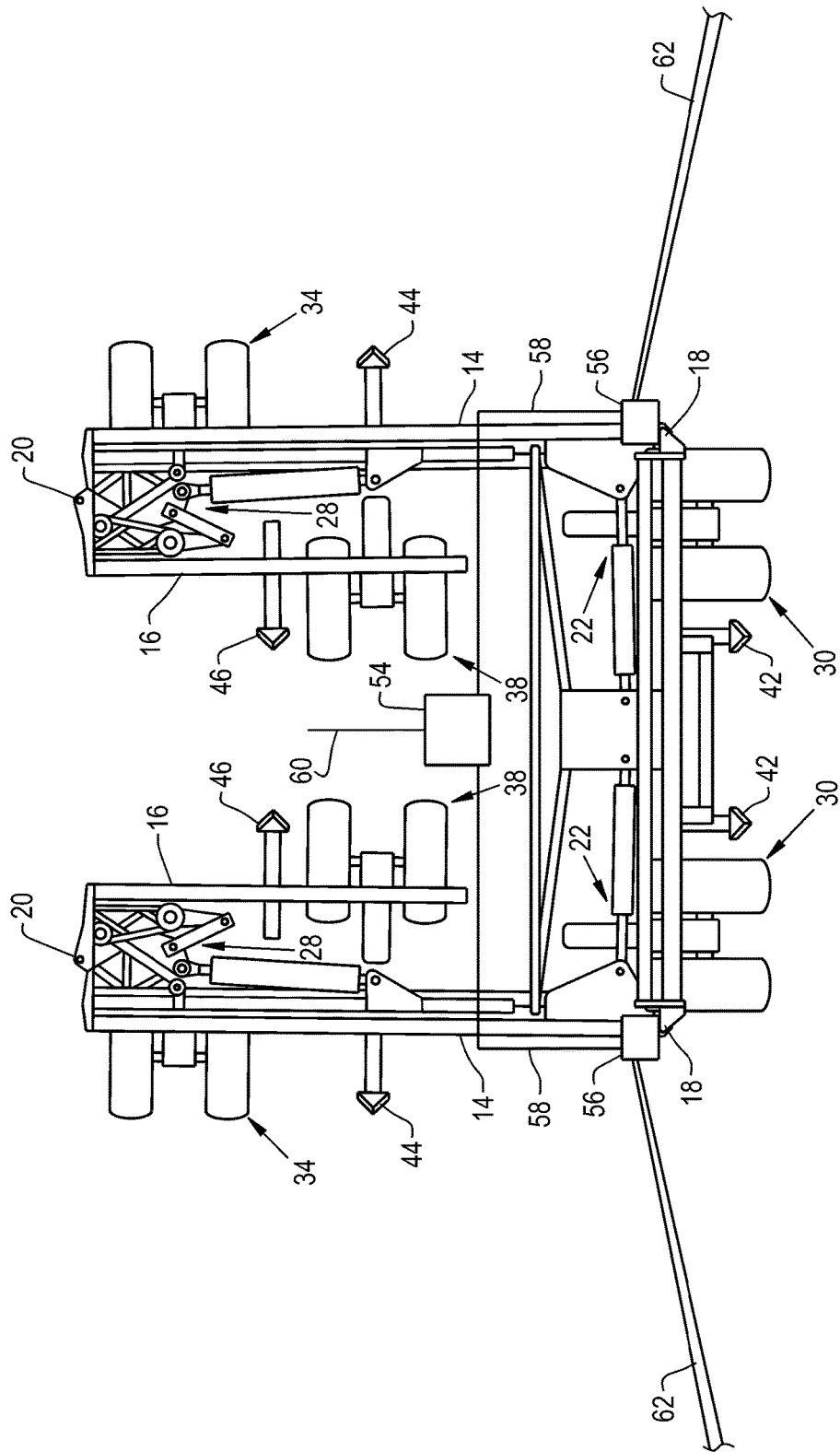
FIG. 1 is a fore and aft view of an agricultural implement embodying the present disclosure shown in its transport position.
Figure 2:
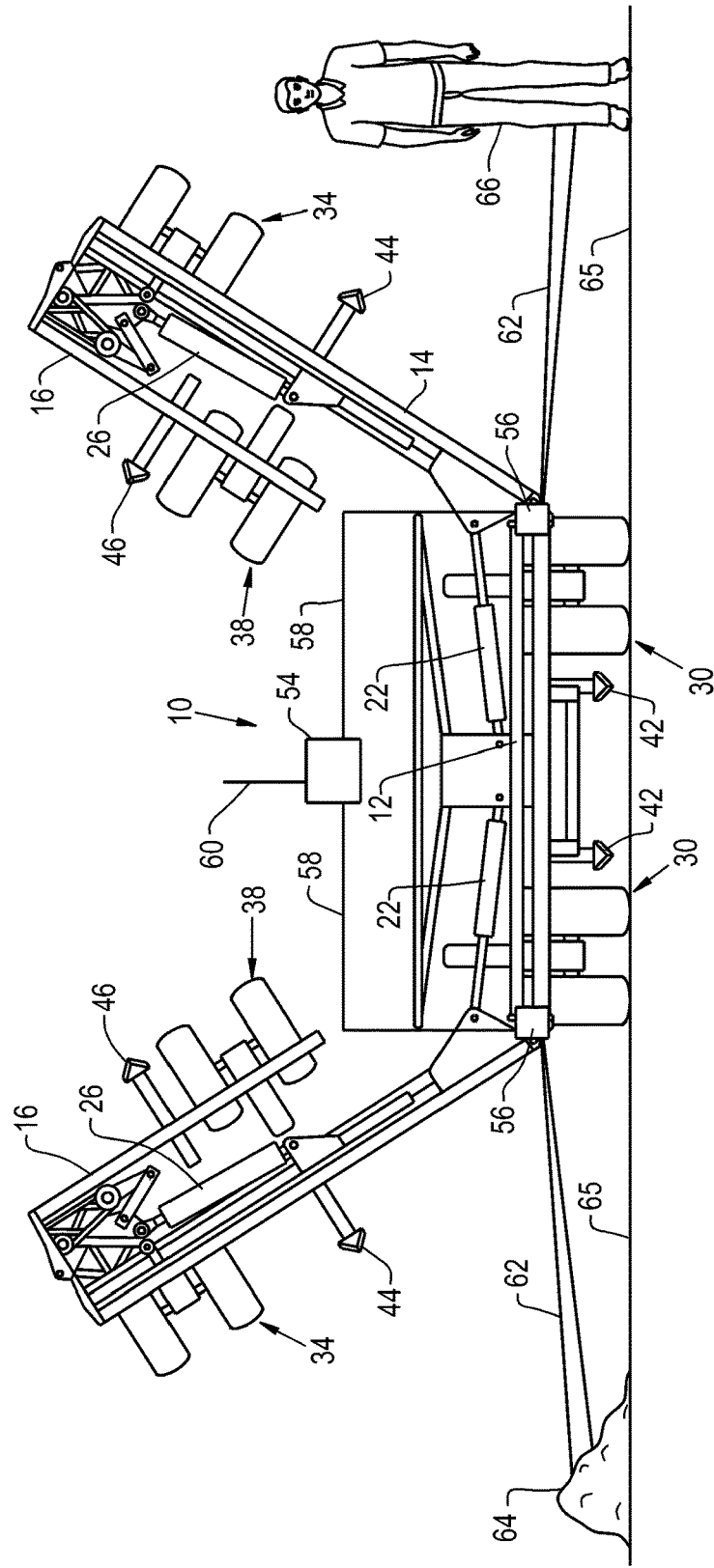
FIG. 2 is a fore and aft view of the agricultural implement of FIG. 1 shown in a transition from a field to the transport position; and, FIG. 3 is fore and aft view of the agricultural implement of FIG. 1, shown in its field position.
Figure 3:
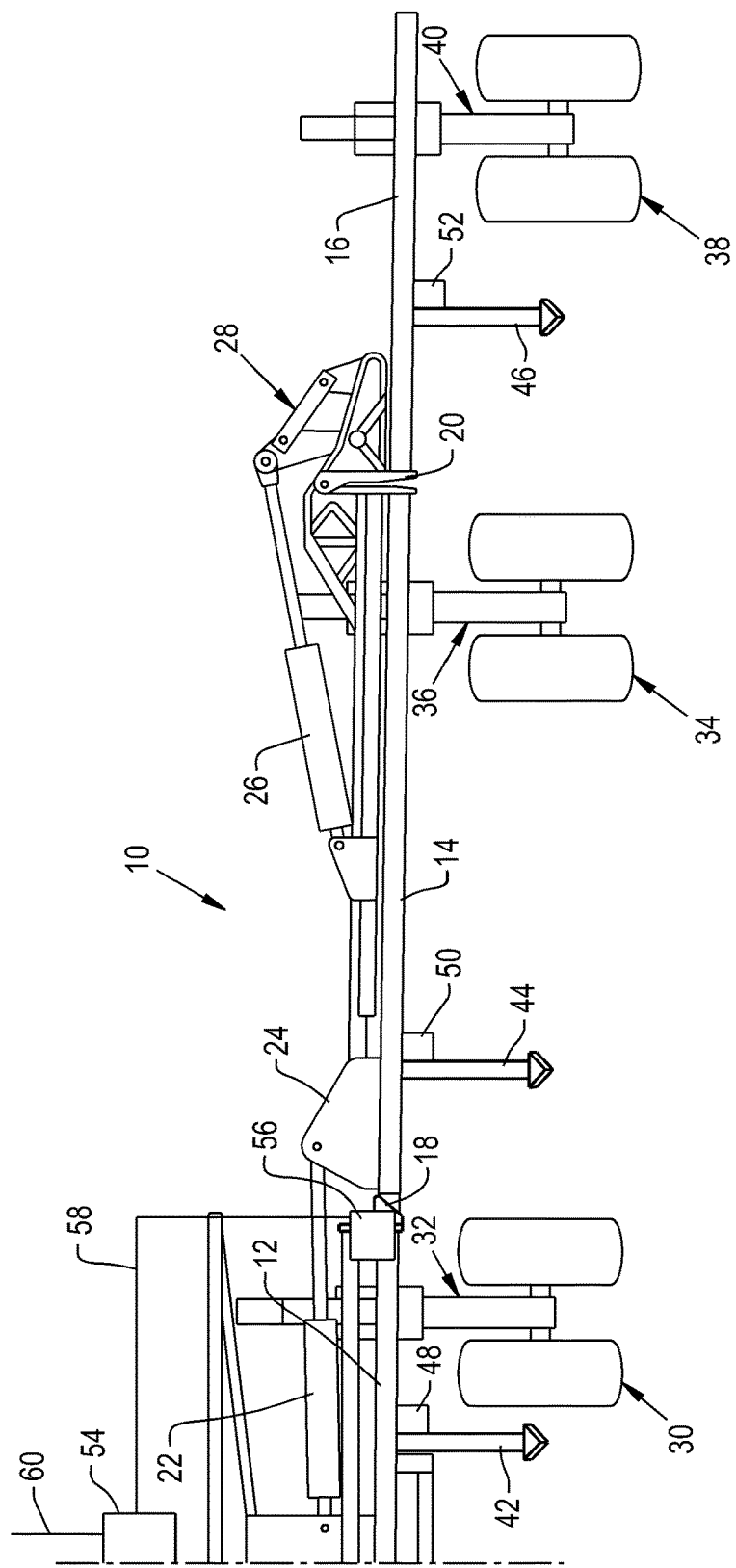

Referring now to the drawings, and more particularly to FIGS. 1-3, there is shown an agricultural implement 10 in the form of a tillage implement for engaging and working the soil. It should be apparent to those skilled in the art that the present disclosure may be used for implements other than tillage implements and realize the same benefits. The implement 10 is shown in its field position and has a center frame member 12 extending on both sides of a symmetrical center line. Inboard frame members 14 and outboard frame members 16 are connected to their respective frame members by hinges 18 and 20. An actuator 22 and frame element 24 connected between frame members 12 and 14 allows the frame members to be pivoted from their illustrated flat position where they extend laterally relative to a direction of travel to a position where they are oriented at approximately 90° respect to one another. Another actuator 26 and linkage 28 interconnect inboard frame member 14 and outboard frame member 16 to pivot the two from the illustrated flat plane position to a position wherein frame member 16 angles approximately 180° with respect to frame member 14.

Ground support wheel assemblies 30 are connected to frame member 12 through a hydraulic lift mechanism 32 to set the level of the ground support wheel assemblies 30 relative to frame member 12 and thus set the field position subsequent transport position in which the ground support wheel assemblies 30 are closer to the frame member.

Another set of ground support wheel assemblies 34 are connected to frame member 14 via hydraulic lift mechanism to set the level of frame member 14 to keep it in a plane with a center frame member 12 during the illustrated field position and to retract the ground support wheel assemblies 34 during the transport position later discussed. Likewise, ground support wheel assemblies 38 are connected to the outboard frame member 16 via hydraulic lift mechanism to position the ground support wheel assemblies 38 from their extended field position in FIG. 1 to the transport position later discussed.

The agricultural implement has a plurality of ground engaging components 42, 44 and 46 connected to frame members 12, 14 and 16 respectively. It is contemplated that a plurality of ground engaging components 42, 44 and 46 are provided on each frame member, but only a small number are shown to simplify the understanding of the present disclosure. The ground engaging components 42, 44 and 46 have component support generally indicated at 48, 50 and 52 to the frame members 12, 14 and 16, respectively.

A hydraulic control unit 54 is usually mounted on a towing vehicle such as a tractor (not shown) for implement 10 to energize the actuators 22 and 26 to transform implement 10 from the transport position of FIG. 1 to the field position of FIG. 3. The actuator lines to the head and rod ends of actuators 22 and 26 are not shown to enable a clearer understanding of the present disclosure. It should be apparent to those skilled in the art that the actuators 22 and 26 would have supply and return lines and the hydraulic control unit 54 would include a source of hydraulic fluid under pressure and appropriate valves to direct the pressure to manipulate the actuators 22 and 26.

As indicated above, the span of current folding agricultural implements is sufficiently great that it is difficult for an operator to observe the outer limits where the wing sections of the implement will be coming down on the ground. In accordance with the present embodiment, a control system is provided to permit controlled lowering of the implement taking into account obstacles that may be in the path of the outer wing sections. This is accomplished by providing sensors 56 at the outer ends of the center frame member 12. Sensors 56 are connected to the hydraulic controller 54 via lines 58. An operator input line 60 also provides input to the hydraulic control unit 54. The sensors 56 are sensors that scan a target area and if an obstacle is present send an appropriate signal to a control device. The sensors 56 may take the form of radar or laser, either having optical or radio frequency waves that bounce off any object to send a signal to the emitting unit indicating the presence of an obstacle.

The signal sent to hydraulic control unit 54 through lines 58 may be used in a number of ways to promote a safe lowering of the implement from the transport position shown in FIG. 1 to the field position of FIG. 3. One such output would be generating an audible and/or visible alarm to alert an operator that an obstacle is present. Another input would be providing a signal that disables the actuators 22 and 26 and prevents any further operator input to lower the implement via input lines 60. It is also contemplated that the signal could be used to reverse the direction of the mechanism to retract it to its transport position of FIG. 1.

The sensors 56 are oriented to project their signal outward into the expected path of the implement when it is extended to its field position of FIG. 3. Preferably the sensors 56 are angled in a slightly downward direction and preferably to intersect the ground adjacent the expected outermost position of the wing sections of the farm implement 10.

The operation of the system will be explained with reference to the figures starting with the transport position of FIG. 1. When it is desired to initiate placing the implement in its field position, the operator sends a control input to the hydraulic control unit 54 through line 60 and the sensors 56 are activated to send beams laterally covering the expected path of the wing sections of the implement 10. As shown in FIG. 2, the beam from 62 from the sensors 56 may hit an object 64 on ground 65 or a person 66, in which case the projected radar or laser beam would be reflected to the sensors 56 applying the appropriate action either in the form of warnings or disabling of the mechanism. If no obstacles are detected the hydraulic control unit causes the actuators to unfold the implement 10 to its full operating position shown in FIG. 3. It should be apparent to those skilled in the art that the beams 62 are not projected when the implement 10 is near its field position so as not to send a false signal to the controller for action when it is not needed.

The above control system offers a simplified and direct system to enable the safe folding and unfolding of an implement. It does so with a minimum of extra equipment and complexity.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method of unfolding a folding ground engaging implement comprising:
    providing a folding ground engaging implement including
        a center frame member;
        ground support wheels connected to the center frame member for guiding the center frame member in a travel direction;
        at least one frame member having a plurality of ground engaging components, the at least one frame member articulated to the center frame member for extending laterally relative to the travel direction to an elongated laterally extended field position and folded inward to a transport position;
        ground support wheels carried by the at least one frame member;
        a device for folding and unfolding the at least one frame member; and,
        a sensor mounted on a front portion of the center frame member and used only during unfolding the at least one frame member, the sensor positioned such that when activated, the sensor aimed in a lateral direction during unfolding of the at least one frame member, wherein the sensor aimed to intersect a laterally outward end of the at least one frame member when it is unfolded into the laterally extended field position;
    initiating unfolding the at least one frame member towards its unfolded position, a beam from the sensor activating and extending below and across a length of a lower side of the at least one frame member during at least a portion of unfolding thereof from the transport position to the laterally extended field position;

determining the presence of an object in a path of the at least one frame member via the beam during the unfolding of the at least one frame member;

generating at least one of a warning signal and a disabling signal to the device in response to detection of an object in the path of the at least one frame member via the beam during the unfolding of the at least one frame member; and deactivating the sensor when no object is identified in the path of the at least one frame member when the at least one frame member is positioned near to an intended field position and the beam of the sensor intersects the laterally outward end of the at least one frame member.

2. The method as claimed in claim 1, wherein the sensor which detects the object is one of a laser sensor and a radar sensor.

3. The method as claimed in claim 1, wherein the folding of the at least one frame member is by a hydraulic actuator which is disabled by the signal when the object is detected in the path of the at least one frame member during the unfolding thereof.

* * * * *